United States Patent
Evans et al.

(10) Patent No.: US 10,842,173 B2
(45) Date of Patent: Nov. 24, 2020

(54) COMPOSITIONS AND METHODS FOR INTRODUCTION OF ODD-CHAIN FATTY ACIDS INTO POULTRY EGGS

(71) Applicant: HELIAE DEVELOPMENT, LLC, Gilbert, AZ (US)

(72) Inventors: Jamie Evans, Gilbert, AZ (US); Micheal LaMont, Gilbert, AZ (US)

(73) Assignee: Heliae Development, LLC, Gilbert, AZ (US)

( * ) Notice: Subject to any disclaimer, the term of this patent is extended or adjusted under 35 U.S.C. 154(b) by 0 days.

(21) Appl. No.: 16/577,384

(22) Filed: Sep. 20, 2019

(65) Prior Publication Data

US 2020/0093157 A1   Mar. 26, 2020

Related U.S. Application Data

(60) Provisional application No. 62/734,437, filed on Sep. 21, 2018.

(51) Int. Cl.
*A23K 20/158* (2016.01)
*A23K 10/30* (2016.01)
*A23K 10/16* (2016.01)

(52) U.S. Cl.
CPC ............ *A23K 20/158* (2016.05); *A23K 10/16* (2016.05); *A23K 10/30* (2016.05)

(58) Field of Classification Search
None
See application file for complete search history.

(56) References Cited

U.S. PATENT DOCUMENTS

| | | | |
|---|---|---|---|
| 4,918,104 A | 4/1990 | Weiss | |
| 7,001,610 B2 | 2/2006 | Stewart | |
| 9,745,606 B2 | 8/2017 | Park | |
| 2010/0010088 A1 | 1/2010 | Chilton | |
| 2011/0195085 A1 | 8/2011 | Kale | |
| 2014/0193867 A1 | 7/2014 | San | |
| 2016/0145656 A1 | 5/2016 | Comini | |
| 2016/0150809 A1 | 6/2016 | Lei | |
| 2017/0202894 A1 | 7/2017 | Lei | |
| 2019/0112528 A1* | 4/2019 | Huang | C09K 17/48 |

FOREIGN PATENT DOCUMENTS

WO   2018002374   1/2018

OTHER PUBLICATIONS

Internatinal Search Report and Written Opinion for PCT/US2019/052143 dated Nov. 15, 2019.
Ginzberg, A et al. "Chickens fed with biomass of the red microalga *Porphyridium* sp. have reduced blood cholesterol level and modified fatty acid composition in egg yolk", 325-6, Journal of Applied Phycology, Web 2000.
Bruneel, Charoltte et al, "Impact of Microalgal Feed Supplementation on Omega-3 Fatty Acid Enrichment of Hen Eggs", 897-8, Journal of Functional Foods, Web 2013.
Navarro, Francisco et al, "Microalgae as a Safe Food Source for Animals: Nutritional Characteristics of the Acidophilic Microalga Coccomyxz Onubenis", 1-10, Food & Nutrition Research. Web 2016.
Fraeye, et al, "Dietary Enrichment of Eggs with Omega-3 Fatty Acids: A review", 961-9. Food Research International. Web 2012.
Lamahieu, et al, "Dynamics of Omega-3 Long Chain Polyunsaturated Fatty Acid Imcorporation in Egg Yolk by Autotrophic Microalgal Supplementation", 1391-7, European Journal of Lipid Science & Technology. Web 2015.
Park, et al. "Effect of Dietary Marine Microalgae (Schizochytrium) Powder on Egg Production, Blood Lipid Profiles, Egg Quality, and Fatty Acid Composition of Egg Yolk in Layers", 391-7. Asian-Australasian Journal of Animal Sciences. Web 2015.
Ao, et al, "Effects of Supplementing Microalgae in Laying Hen Diets on Productive Performance, Fatty-Acid Profile, and Oxidative Stability of Eggs", 394-7, Journal of Applied Poultry Research. Web 2015.
Ganuza Taberna, Eneko, "Heterotrophic cultivation of microalgae as a source of docosahexaenoic acid for aquaculture," 2008, doctoral thesis, ISBN: 978-84-692-1838-9, URI: http://hdl.handle.net/10553/2247.
Song, et al., "Different Impacts of Short-Chain Fatty Acids on Saturated and Polyunsaturated Fatty Acid Biosynthesis in *Aurantiochytrium* sp. SD116", Journal of Agricultural and Food Chemistry, 2013, 61, 9876-9881.
Kaya, et al., "On the function of pentdecanoic acid and docosahezaenoic acid during culturing of the thraustochytrid, *Aurantiochytrium* sp. NB6-3", Journal of Biochemical & Microbial Technology, 2015, 3[1]:1-7.

\* cited by examiner

*Primary Examiner* — Susan M Hanley
(74) *Attorney, Agent, or Firm* — Heliae Development LLC; Adam Lunceford

(57) ABSTRACT

Disclosed are compositions and methods for producing a poultry egg that is rich in odd-chain fatty acid (OCFA), particularly pentadecanoic acid (C15:0) and heptadecanoic (C17:0) acid. Poultry feed can be mixed with a compound (e.g. biomass or oil extract) that is produced from microalgae cultured to comprise elevated levels of OCFA. The OCFA-enriched poultry feed comprises an elevated level of OCFA and it can be fed to poultry that are laying eggs. As the OCFA-enriched feed is incorporated by the poultry, the resulting eggs comprise yolks that are rich in OCFA. The OCFA rich eggs can be consumed by humans as a dietary source of OCFA, to improve health.

18 Claims, 5 Drawing Sheets ial Application No. 62/734,437, titled Introduction of Odd-
COMPOSITIONS AND METHODS FOR INTRODUCTION OF ODD-CHAIN FATTY ACIDS INTO POULTRY EGGS

CROSS-REFERENCE TO RELATED APPLICATION

This application claims the benefit of U.S. Provisional Application No. 62/734,437, titled Introduction of Odd-Chain Fatty Acids Into Eggs, which was filed on Sep. 21, 2018 in the name of the Applicant and which is incorporated herein in full by reference.

FIELD OF THE INVENTION

This application relates generally to uses for microalgae biomass rich in odd-chain fatty acid and, more specifically, to compositions and methods for introduction of odd-chain fatty acids into poultry eggs.

BACKGROUND

The citric acid cycle can govern the energy metabolism in aerobic organisms by producing 2 $CO_2$, 3 NADH, 1 FADH2, and 1 ATP from the oxidation of acetyl-coA at every turn of the cycle. In addition, the cycle can provide precursors for biosynthesis of several amino acids, lipids, chlorophyll and other growth-related metabolites. The citric acid cycle is non-catalytic, which means that molecules used in biosynthesis are replenished so that the cycle can keep generating energy. Regardless of how much acetyl CoA is fed into the citric acid cycle, the cycle is able to produce merely a limited amount of citric acid intermediates. Anaplerotic substrates can be used to produce intermediates that are used to replenish the oxidative capacity of the citric acid cycle.

Anaplerosis refers to the process of replenishing the citric acid cycle intermediates and restoring energy balance of the cell (metabolic homeostasis). Odd-chain fatty acids (OCFAs) can be considered anaplerotic because, along with acetate units, they can also release propionic acid which can enter the citric acid cycle through the methylmalonate pathway (OCFA catabolism). Typical dietary sources of OCFA are milk and butter, but they have only trace amounts (<2% total fatty acids, TFA) of pentadecanoic (C15:0) and heptadecanoic (C17:0) acid. Synthetically produced concentrated sources, such as tripentanoin and triheptanoin (e.g., oils containing C5:0 and C7:0), are not considered nutritional lipids. Further, current methods that involve the use of *Yarrowia lipolytica* to produce odd-chain fatty acids utilize genetic modification.

Odd-chain fatty acids are known to have potential health benefits including, but not limited to, reduction of incidence of type 2 diabetes, heart disease, and stroke as well as reducing incidence of neuro-degenerative diseases such as Alzheimer's disease and Lou Gehrig's disease. However, a primary constraint with OCFAs is the lack of their cost-effective availability. Thus, a need exists for a natural and cost-effective source of OCFAs, particularly C15:0 and C17:0 (two long odd-chain fatty acids), that may be incorporated into a commonly consumed food product.

Currently, poultry eggs that are rich in OCFA are not available. Eggs are already well-accepted as a source of protein and energy, and eaten by most people. Creating an egg with 10 times more (or more) OCFA than conventional eggs, using the techniques described herein, results in a product that is a quick, easy, readily available, and cost-effective way to introduce the healthy OCFA to a human diet. Further, the process of adding an OCFA rich biomass, or OCFA rich oil, to poultry feed is an easy and cost-effective way to produce the eggs that are rich in OCFA. The methods described here also detail how the biomass or oil rich in OCFA can be produced.

SUMMARY OF THE INVENTION

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Disclosed are compositions rich in odd-chain fatty acids, including pentadecanoic (C15:0) and heptadecanoic (C17:0) fatty acids, and products rich in pentadecanoic and heptadecanoic fatty acids derived from microalgae. In some embodiments, the total fatty acid profile of the composition includes a fraction comprising at least about sixty percent (60%) odd-chain fatty acids (OCFA), and about twenty-five (25%) docosahexaenoic acid (DHA).

The microalgae and/or compositions rich in pentadecanoic and heptadecanoic acids may be used as a poultry feed or poultry feed ingredient. Methods and systems for increasing the production or concentration of pentadecanoic and heptadecanoic fatty acids from microalgae are also disclosed herein.

Further, techniques are disclosed for increasing the concentration of OCFA in eggs, such as poultry eggs. For example, a biomass or oil rich in OCFA can be incorporated into poultry feed and fed to the egg-laying poultry. The OCFA in the feed fed to the poultry animals can result in an increase in the OCFA concentration in the fatty acid profile of the yolk of a resulting egg laid by the poultry animal.

Additionally, techniques are disclosed for creating poultry feed that is rich in OCFA. For example, a poultry feed can be mixed with a compound derived from microalgae that is rich in OCFA. The resulting mixed poultry feed that is rich in OCFA can be fed to poultry to produce eggs that are rich in OCFA. For example, the OCFA eggs can be consumed by humans as a source of OCFA in their diet to improve health.

In accordance with one or more embodiments of the present invention, an OCFA-enriched poultry feed having an elevated level of odd-chain fatty acid (OCFA) is disclosed. The OCFA-enriched poultry feed comprises: poultry feed; and a microalgae compound produced from culturing microalgae to produce microalgae with elevated levels of odd-chain fatty acid, the microalgae compound comprising one of a biomass and an extracted oil; and wherein the microalgae compound is mixed with the poultry feed at an inclusion rate greater than one percent of a resulting OCFA-enriched poultry feed.

In accordance with one or more embodiments of the present invention, a poultry egg is disclosed. The poultry egg comprises an elevated level of OCFA, the elevated level comprising an amount greater than 3% percent of the fatty acid profile of the yolk, wherein the poultry egg was laid by a poultry animal having been fed an OCFA-enriched poultry feed composition comprising an effective amount of an OCFA-rich microalgae compound.

In accordance with one or more embodiments of the present invention, a method for producing a poultry egg with an elevated amount of odd-chain fatty acid (OCFA) is disclosed. The method comprises: mixing a desired amount of OCFA-rich microalgae compound into poultry feed resulting in OCFA-enriched feed composition, the desired amount comprising greater than one percent of the OCFA-enriched feed; feeding the OCFA-enriched feed composition to poultry that lays eggs; and retrieving an egg produced by the poultry, the egg comprising an elevated amount of OCFA in the lipid profile of the yolk.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The innovative concepts described herein may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
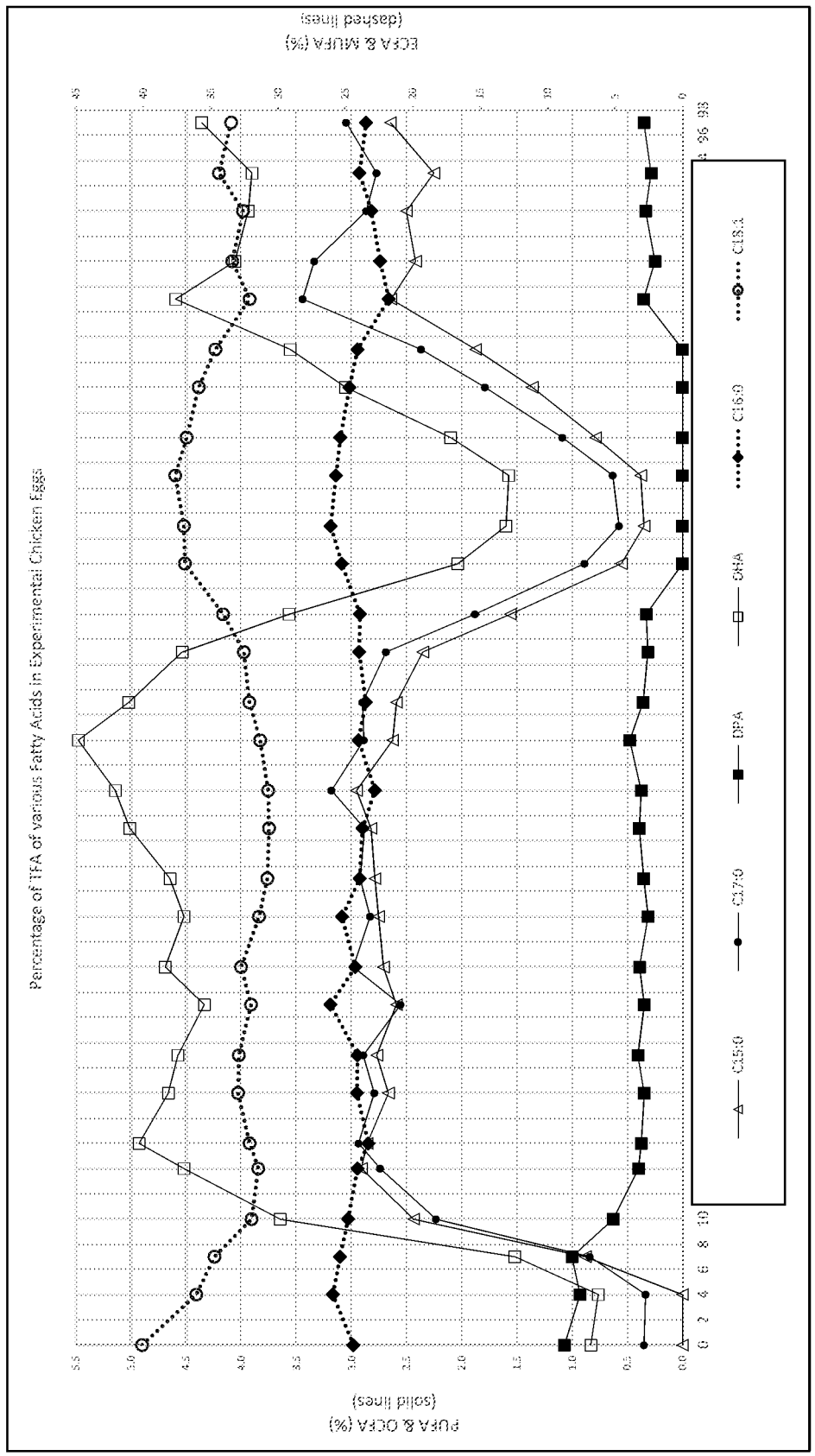
FIG. 1 is a line graph showing the fatty acid composition (in percent TFA) of various fatty acids in the eggs of the test group chickens.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

With reference to the drawings, like reference numerals designate identical or corresponding parts throughout the several views. However, the inclusion of like elements in different views does not mean a given embodiment necessarily includes such elements or that all embodiments of the innovative concepts described herein include such elements. The examples and figures are illustrative only and not meant to limit the innovative concepts described herein, which is measured by the scope and spirit of the claims.

The term "microalgae" refers to microscopic single cell organisms such as microalgae, cyanobacteria, algae, diatoms, dinoflagellates, freshwater organisms, marine organisms, or other similar single cell organisms capable of growth in phototrophic, mixotrophic, or heterotrophic culture conditions. The term "biomass" means a composition wherein substantially all of the components of the microalgae cells produced in the composition during culturing/growth remain present (e.g., in certain aspects of the invention at least about 90% of the cellular components, at least about 95% of the cellular components, or at least about 99% of the cellular components produced during growth/culturing remain present).

In some embodiments, the microalgae biomass or extracts may be sourced from the class Labyrinthulomycetes to make a composition that may be used to increase odd-chain fatty acid concentrations in poultry eggs. The class Labyrinthulomycetes includes species of *Schizochytrium* and *Aurantiochytrium*.

Non-limiting examples of microalgae genus and species that can be used in the compositions and methods of the claimed subject matter include: *Aurantiochytrium* sp., *Aurantiochytrium acetophilum* HS399, *Chlorella* sp., *Haematococcus* sp., *Galdieria* sp., *Isochrysis* sp., *Micractinium* sp., *Porphyridium* sp., *Schizochytrium* sp., *Thraustochytrium* sp., and *Oblongichytrium* sp.

Taxonomic classification has been in flux for organisms in the genus *Schizochytrium*. Some organisms previously classified as *Schizochytrium* have been reclassified as *Aurantiochytrium*, *Thraustochytrium*, or *Oblongichytrium*. See Yokoyama et al. Taxonomic rearrangement of the genus *Schizochytrium sensu lato* based on morphology, chemotaxonomic characteristics, and 18S rRNA gene phylogeny (Thrausochytriaceae, Labyrinthulomycetes): emendation for *Schizochytrium* and erection of *Aurantiochytrium* and *Oblongichytrium* gen. nov. Mycoscience (2007) 48:199-211. Those of skill in the art will recognize that *Schizochytrium*, *Aurantiochytrium*, *Thraustochytrium*, and *Oblongichytrium* appear closely related in many taxonomic classification trees for microalgae, and strains and species may be re-classified from time to time. Thus, for references throughout the instant specification for *Schizochytrium*, it is recognized that microalgae strains in related taxonomic classifications with similar characteristics to *Schizochytrium*, such as *Aurantiochytrium*, would reasonably be expected to produce similar results.

In some embodiments, the microalgae may be cultured in phototrophic, mixotrophic, or heterotrophic culture conditions in an aqueous culture medium. For embodiments where the microalgae is *Aurantiochytrium acetophilum* HS399, the *Aurantiochytrium acetophilum* HS399 is may be cultured in either mixotrophic or heterotrophic culture conditions in an aqueous culture medium. The organic carbon sources suitable for growing microalgae mixotrophically or heterotrophically may comprise: acetate, acetic acid, ammonium linoleate, arabinose, arginine, aspartic acid, butyric acid, cellulose, citric acid, ethanol, fructose, fatty acids, galactose, glucose, glycerol, glycine, lactic acid, lactose, maleic acid, maltose, mannose, methanol, molasses, peptone, plant based hydrolyzate, proline, propionic acid, ribose, sacchrose, partial or complete hydrolysates of starch, sucrose, tartaric, TCA-cycle organic acids, thin stillage, urea, industrial waste solutions, yeast extract, and combinations thereof. The organic carbon source may comprise any single source, combination of sources, and dilutions of single sources or combinations of sources. In some embodiments, the microalgae may be cultured in axenic conditions. In some embodiments, the microalgae may be cultured in non-axenic conditions.

Anaplerosis refers to the replenishment of the citric acid intermediates that have been extracted by the cell for biosynthesis. Anaplerotic substrates, such as glucose, protein and odd-chain fatty acids, could be converted into citric acid intermediates to restore an energy imbalance of the cell. OCFAs are different from other anaplerotic substrates because they can undergo ketosis and cross the blood-brain barrier. Therefore, OCFAs have been associated with a decrease in metabolic disease risk, and their intake has been proposed for the treatment and prevention of various gene and brain disorders. The presence of OCFAs in diet is scarce and typically limited to ruminant fat (e.g., butter), which contains only trace amounts (<2% total fatty acid (TFA)) of pentadecanoic acid (C15:0) and heptadecanoic acid (17:0). Existing pharma OCFAs, such as tripentanoin and triheptanoin oils, are produced synthetically, and are made of fatty acids that are not typically present in a human diet. Alternatively, as described herein, a microbial process may be devised that can result in a natural algal oil comprising large (>50 TFA) quantities of dietary (C15:0 and C17:0) OCFAs.

Typical anaplerotic substrates can include pyruvate (e.g., derived from carbohydrates), glutamine/glutamate (e.g., derived from protein) and precursors of propionyl-CoA, such as odd-chain fatty acids. Anaplerotic substrates can be used to restore energy balance in the mitochondria; and, there is a wide range of pathologies to which odd-chain fatty acids may provide benefits. As an example, in this aspect, odd-chain fatty acids have been experimentally used to treat: gene metabolic disorders, such as Glutl deficiency, Fatty Acid Oxidation Disorder (FAOD), Pyruvate Carboxylase Deficiency, Carnitine Palmitoyltransferase II Deficiency, Huntington, Phenylketonuria, Adult Polyglucosan Body Disease (APBD), and Long-Chain Fat Oxidation Disorders; neural disorders, such as Epilepsy, Alzheimer's Disease, and Autism Spectrum Disorder (ASD); and circulatory system disorders, such as Ventricular Hypertrophy, and stroke.

Dietary odd-chain fatty acids, pentadecanoic acid (C15:0) and heptadecanoic acid (C17:0), also known as margaric acid, may be derived from ruminant fat (e.g., butter), and are thought to be likely derived from bacterial activity in the rumen of dairy producing animals. These OCFAs can be found in very small amounts (e.g., <2% total fatty acids (TFA)) in some dairy products (e.g., milk and butter). Pentadecanoic acid (C15:0) and heptadecanoic acid (C17:0) have also been found to be produced in the human gut, which may be triggered by dietary fiber intake, presumably supporting bacterial activity. Ref. 1. Because only trace amounts of odd-chain fatty acids (e.g., C15:0 and C17:0) are present in human diets, alternative sources (i.e. nutraceuticals, medical foods or therapeutics) can be used to significantly increase the intake of this type of nutrient.

Currently, merely limited amounts of odd-chain fatty acids (e.g., C15:0 and C17:0) are readily available from known natural, dietary sources, such as ruminant fat. In one aspect, compositions can be created that comprise a higher concentration than current sources of odd-chain fatty acids such as pentadecanoic and heptadecanoic fatty acids. Further, in one aspect, a method can be devised for efficient and affective generation of such fatty acids from a newly derived source.

Microalgae can produce a variety of fatty acids, the composition of which can vary among different strains. As an example, thraustochytrids can accumulate lipids up to eighty-five (85%) of their dry weight; and, amongst the oleaginous microorganisms, they may be one of the fastest growing. Further, these organisms can be adapted to fermentation conditions (e.g., low shear sensitivity, high osmotolerance) for use in industrial production of microbe-based oils. For example, *Aurantiochytrium acetophilum* HS399 (hereinafter, "HS399") is a thraustochytrid that can produce an oil containing palmitic acid (e.g., 45% total fatty acids (TFA)), n-6 docosapentaenoic acid (e.g., 8% TFA), and n-3 docosahexaenoic (e.g., 40% TFA) as the main fatty acids, with other fatty acids present in trace amounts. Pursuant to the requirements of the Budapest Treaty, a live culture of the *Aurantiochytrium acetophilum* HS399 microalgae strain described herein was deposited on Sep. 12, 2019 at National Center for Marine Algae and Microbiota (NCMA), located at 60 Bigelow Drive, East Boothbay, Me. 04544, USA and received accession number 201909001.

The trace fatty acids of HS399 can include pentadecanoic acid (C15:0) and heptadecanoic acid (C17:0) (e.g., at <0.3% TFA). The trace fatty acids, including these two identified fatty acids, are typically ignored in the lipid profile reports for these organisms. Odd-chain fatty acids, including pentadecanoic acid and heptadecanoic acid, are fatty acids that contain an odd number of carbon atoms in the structure. Pentadecanoic acid and heptadecanoic acid are both considered long chain fatty acids because they both contain more than 12 carbon atoms. OCFAs are typically related to bacterial activity (i.e. propionic acid bacteria), and are less likely to be present in algae or plants. Ref. 2

*Aurantiochytrium acetophilum* HS399 naturally contains trace amounts of C15:0. The presence of trace amounts in *Aurantiochytrium acetophilum* HS399 suggests that the pathway responsible for the synthesis of OCFA may be present in *Aurantiochytrium acetophilum* HS399. Because of the composition of their fatty acid profile, and their ability to be grown rapidly, microalgae such as *Aurantiochytrium acetophilum* HS399 provide an attractive source of odd-chain fatty acids by generating odd-chain fatty acids in a more concentrated manner than other known natural sources, such as milk fat (e.g., providing a more cost effective and efficient source of OCFA). As an example, a benefit of using microalgae in place of butter and other ruminant fat is the higher concentration of OCFA found in them. In addition, as another example benefit, some microalgae oil lacks residues of phytol or phytanic acid that are often present in ruminant fat. Consumption of phytol or phytanic acid can lead to health concerns in some individuals.

Techniques have been devised that provide for an increased production of naturally occurring odd-chain fatty acids from microalgae. The cultivated microalgae and/or isolated composition may be used individually as products or as an ingredient in a variety of products. As an example, microalgae such as *Aurantiochytrium acetophilum* HS399 can be cultivated to produce a desirable fatty acid profile comprising OCFAs, which may be isolated through various extraction processes. In this example, the isolated oil containing the OCFAs may comprise a composition rich in OCFAs, such as pentadecanoic acid (C15:0) and heptadecanoic acid (C17:0). However, in one implementation, the microalgae may be cultivated using an improved method that includes the presence of a complex media, which can promote increased production of the OCFAs.

In one or more embodiments, propionic acid (e.g., and or one or more propionates, such as the anion, salts, and/or esters of propionic acid) may be used as a precursor for production of OCFA. In this implementation, for example, it is likely that *Aurantiochytrium acetophilum* HS399 can incorporate propionic acid in its lipid generation pathway, resulting in the production of OCFAs.

Generally, fatty acid synthesis in microalgae consists of a lipid synthesis pathway involving acetyl CoA, and some metabolic cycles. As an example, acetyl-coenzyme A (CoA) is a universal carbon donor for fatty acid biosynthesis.

Acetyl-CoA can be supplied be multiple paths, from various origins, and then subsequently metabolized into malonyl-acyl carrier protein (ACP) (or Malonyl CoA) by sequential reactions (e.g., utilizing acetyl-CoA carboxylase (ACCase) in carboxylation of A CoA). In this example, fatty acid synthesis follows, resulting in the production of the fatty acids.

The genome of *Aurantiochytrium acetophilum* HS399 suggests that saturated fats are synthetized through the Fatty Acid Synthase (FAS) pathway that uses acetyl-coA as a building block for the fatty acid elongation. The production of even chain fatty acids uses a malonyl-ACP as a substrate for elongation. As described herein, in one implementation, when propionic acid is present the acyl carrier protein (ACP) cleaves to methylmalonyl instead of malonyl, resulting in the FAS producing of odd-chain fatty acids instead of even chain fatty acids. Palmitic acid (C16:0) is typically the primary even chain fatty acid in HS399, while the primary OCFAs is typically pentadecaenoic (C15:0) instead of heptadecanoic acid (17:0). In this implementation, fatty acid synthesis of palmitic acid (C16:0) undergoes 6 consecutive elongation cycles, while the (C15:0) OCFA undergoes only 5 elongation cycles before the fatty acid is liberated from the acyl carrier protein. In one implementation, a microbial process may be used to culture microalgae, which can result in a microalgae biomass and/or microalgae oil comprising large (>50 TFA) quantities of dietary OCFA (C15:0 and C17:0). Such quantities of dietary OCFA (C15:0 and C17:0) are significantly higher than what is found in the naturally occurring microalgae.

In addition to the common and traditional use of propionic acid as an antimicrobial agent that kills algae, as described herein, techniques have been devised for propionic acid to be used to facilitate the growth of microalgae, and/or to increase OCFA production in the microalgae. In one implementation, in this aspect, propionic acid (e.g., and/or propionates) can be introduced into an algal bioprocess using a fed-batch approach, while reducing the potential toxic effects on the algae. According to one or more embodiments, microalgae such as *Aurantiochytrium acetophilum* HS399 can be added to the culture medium. Propionic acid may then be added to the culture medium comprising the *Aurantiochytrium acetophilum* HS399 in a batch, continuous feed, or fed-batch process, and cultured in a bioreactor with the culture medium.

In one embodiment, the *Aurantiochytrium acetophilum* HS399 cells were cultured in a two-stage axenic process which first feeds DE95 (which comprises about 95% dextrose) as a growth carbon source and then, after a specified period of time, feeds propionate to the microalgae, which causes the microalgae to produce OCFA as a part of its fatty acid profile. The "two-stage axenic process" refers to the first stage wherein propionate is not fed to the microalgae and the second stage wherein propionate is fed to the microalgae. The propionic acid can be added at a ratio of at least 0.05 g of propionic acid per gram of *Aurantiochytrium acetophilum* HS399 biomass, in order to accumulate elevated amounts of OCFA. In one embodiment, 0.15 g of propionic acid is added per gram of *Aurantiochytrium acetophilum* HS399 biomass, in order to accumulate OCFA above 50% TFA. In another implementation, the propionic acid can be added at a rate of above zero and up to about 3 g/L per day. In one implementation, the propionic acid can be added at a rate of above zero and up to about 3 g/L per day for three days, resulting in a total propionic acid addition of about 9 g/L. In one embodiment, adding the propionate can comprise adding the propionate in a fed-batch approach into the culture medium. In one embodiment, adding the propionate can comprise adjusting the propionate fed to produce OCFAs in a range of 5 and 70% TFAs. Optionally, anaplerotic oil containing concentrated amounts of OCFA can be extracted from the *Aurantiochytrium acetophilum* HS399. In one embodiment, anaplerotic oil can be produced from the cultured microalgae, wherein at least five percent of the total fatty acids (TFA) of the anaplerotic oil are OCFAs, and OCFAs make up at least one percent cell dry weight (CDW) of the anaplerotic oil. Although the above method is disclosed in detail, it should be clearly understood that substantial benefit may still be obtained from using alternative culturing methods that would cause the microalgae to produce elevated levels of OCFA as a part of its fatty acid profile such as, but not limited to, the methods discussed in International Application Number PCT/US2018/067104, Taberna et al., which is incorporated herein in full by reference.

After the *Aurantiochytrium acetophilum* HS399 cells achieved the desired OCFA profile, they were harvested, washed (i.e. diluted with water in a ratio of 2:1 and centrifuged in order to remove dissolved material and small particles), and then dried with NATUROX® antioxidant thus forming the *Aurantiochytrium acetophilum* HS399 biomass used in the experiments described herein. It should be clearly understood that other variations of the *Aurantiochytrium acetophilum* HS399 biomass microalgae, including variations in the microalgae strains, microalgae growth or processing methods, or variations in the stabilizers, may be used and may achieve similar results.

The anaplerotic oil produced by microalgae can contain a substantial amount of DHA, which is a valuable nutraceutical. For example, DHA (docosahexaenoic acid) is a fatty acid that is commonly found in the meat of cold-water fish (e.g., tuna, salmon, cod, etc.). DHA has been found to early brain development in infants, and may improve the vision and cognitive function development. Further, DHA has been used for treating type 2 diabetes, coronary artery disease (CAD), dementia, depression, and attention deficit-hyperactivity disorder (ADHD), as well as improving vision and cognitive function in adults. Additionally, DHA can be converted into eicosapentaenoic acid (EPA) in the body, which is used in the prevention and reversal of heart disease, stabilizing heart rhythm, asthma, cancer, painful menstrual periods, hay fever, lung diseases, systemic lupus erythematosus (SLE), and certain kidney diseases. Both EPA and DHA have been used in combination to treat high cholesterol, high blood pressure, psoriasis, Raynaud's syndrome, rheumatoid arthritis, bipolar disorder, certain inflammations of the digestive system (ulcerative colitis), and to prevent migraine headaches in teenagers. In one or more embodiments, the anaplerotic oils produced by *Aurantiochytrium acetophilum* HS399 may contain OCFAs C15:0 and C17:0 at 60% TFA and DHA at about 25% TFA.

In one implementation, the propionate fed approach can cause some growth inhibition in the microalgae, but may not result in a complete culture loss of the microalgae batch. In this implementation, the fed-batch approach may achieve similar cell densities and overall lipid accumulation as a similar control batch with no propionic acid fed, with merely a one-day difference. As one example, propionic acid may be fed into the algal culture batch on demand (e.g., automatically fed using a pH-auxostat fed batch system). As another example, propionic acid may be fed into the microalgal batch along with a carbon source (e.g., glucose, glycerol or acetate) at a ratio below 0.1 of weight to weight (w/w) of propionic acid to carbon source (propionic acid/carbon source ratio). In another example, propionic acid may be fed along with the carbon source at a ratio below 0.05 w/w propionic acid to carbon source, to mitigate or avoid accumulation of propionate in the culture media. In one example, propionic acid may be fed into a culture at a culture pH higher than 5. A low pH increases the toxicity of propionic acid making it more difficult to balance the window between propionate incorporation and growth inhibition. Specific details and experiments regarding the methods for increasing odd-chain fatty acid production in microbials such as microalgae (e.g. *Aurantiochytrium acetophilum* HS399) are provided in International Application Number PCT/US2018/067104, Taberna et al., which is incorporated herein in full by reference.

Techniques and systems were devised to incorporate OCFAs (as well as DHA) found in the resulting microalgae biomass and/or microalgal oil into poultry eggs. As an example, the biomass rich in OCFA, and/or the oil rich in OCFA, were processed into poultry feed and fed to layer chickens. In this example, the enriched feed can be fed to poultry animals, such as chickens, resulting in the incorporation of OCFA in the compositional profile of the poultry egg. In this way, for example, the enriched eggs can be a vehicle for delivering the OCFA to human consumers. As a result, a healthier egg can be created which can provide positive benefits to the cardiometabolic health (e.g., heart disease, diabetes, and stroke) of the human consumers, at a lower cost than typical pharmaceutical or nutraceutical treatments.

In one aspect, a biomass of microalgae rich in OCFA can be fed to poultry animal, such as chickens, directly or as a processed feed. In one implementation, in this aspect, the biomass can be fed directly to the poultry, for example, as a supplement to other feed. In another implementation, the biomass can be processed into a pelletized form and fed to the poultry, for example, as a supplement to other feed. In another implementation, the biomass can be combined with typical poultry feed, and the combination can be processed into a pelletized form as poultry feed.

In one implementation, the increased amount of OCFA in whole biomass can be mixed with standard poultry food, for example, in the range of 1.5-6.3% inclusion of the biomass into the feed. In this implementation, the mixed feed can then be fed to the poultry (e.g., chickens). The poultry can eat the food, for example, for chickens at the standard 0.2-0.25 lbs. per day of total food intake. In this implementation, the OCFA can be incorporated into the developing egg, and will appear as part of the fatty acid compositional profile of the yolk of the resulting poultry egg.

In another implementation, the whole biomass can be mixed with standard poultry food, for example, in the range of 1.5-6.3% inclusion of the biomass into the feed. In this implementation, the mixed feed can then be processed into pellets, which include the biomass rich in OCFA. Further, the pelletized mixed feed can be fed to the poultry, in a similar manner as above.

In another implementation, oil derived from the biomass, such as algal oil, comprising the elevated concentration of OCFA, can be mixed with standard poultry food, for example, in the range that may be the same as that of the whole biomass (e.g. 1.5-6.3% inclusion) or may be less than that of the whole biomass (e.g., 0.5% to 4% inclusion of the oil into the feed). In this implementation, the oil-feed mix can be fed to the poultry. In another implementation, the oil-feed mix can be processed into pellets, and fed to the poultry.

The resulting egg produced by the poultry, using the techniques described herein, may include an increase in OCFA over eggs produced by poultry that are not subjected to the treated feed. For example, the pathway for digestion of fat by a chicken results in approximately 50 to 65% of the fat intake directed to produce egg yolks. That is, for example, whatever fat the chicken intakes can end up in a resulting egg yolk. Further, some of the OCFA eaten by poultry may not end up as OCFA in the resulting yolk. For example, some fatty acids may be metabolized for energy, stored, or incorporated in muscle. In one implementation, the composition impact on the egg can be in the range of about 1% to 6.2% of total OCFA (C15:0 plus C17:0), of the total fatty acid profile of the egg.

In accordance with one or more embodiments of the present invention, an OCFA-enriched poultry feed was created. To prepare the OCFA enriched feed, a standard commercially available chicken feed (e.g. PETCLUB Layer Crumbles) was provided and used as the base feed. A 2.6% inclusion rate of OCFA rich *Aurantiochytrium acetophilum* HS399 biomass was combined with the standard conventional feed, thus creating the OCFA-enriched poultry feed. This was accomplished by mixing the correct inclusion rate of OCFA rich *Aurantiochytrium acetophilum* HS399 biomass with the base feed evenly, and then forming the new composition into pellets for the subject chickens to consume. Although a 2.6% inclusion rate of OCFA-rich *Aurantiochytrium acetophilum* HS399 biomass was used in the experiment, it should be clearly understood that substantial benefit would be obtained by using an alternative rate such as 1.5-6.3% of inclusion of OCFA-rich *Aurantiochytrium acetophilum* HS399 biomass in the feed, which would likely result in about 250 mg to 1,000 mg of OCFA per egg. The % inclusion of the OCFA-rich *Aurantiochytrium acetophilum* HS399 biomass (or OCFA-rich *Aurantiochytrium acetophilum* HS399 oil) may be increased or decreased depending upon how much OCFA is desired to be present in the resulting egg yolk.

It should be noted that this is merely one example from an initial study of the effectiveness of the techniques described herein. It is expected that the amount of OCFA can be even higher when fed to poultry over an extended period of time, for example, two to three times higher, or more. It should be clearly understood that although OCFA rich *Aurantiochytrium acetophilum* HS399 biomass was used in this experiment to create the OCFA-enriched poultry feed, the same results would still be obtained if the OCFA rich oil was extracted from the OCFA rich *Aurantiochytrium acetophilum* HS399 biomass and the extracted OCFA rich oil was mixed with the standard conventional feed. Of note, C15:0 and C17:0 fatty acids are the long odd-chain fatty acids identified in this example, as italicized and bolded below.

The OCFA rich *Aurantiochytrium acetophilum* HS399 biomass used for this experiment had an elevated amount of C:15 and C:17, in particular. Table 1 below shows a comparison of the fatty acid profiles of the standard conventional feed alone versus the OCFA-enriched poultry feed. With respect to C15:0 and C17:0 in particular, the OCFA-enriched poultry feed contained 0.88% TFA of C15:0 while the standard conventional feed contained absolutely no C15:0 OCFA; furthermore, the OCFA-enriched poultry feed contained 0.84% TFA of C17:0 OCFA while the standard conventional feed only contained 0.12% TFA of C17:0 OCFA.

TABLE 1

Conventional Feed vs. OCFA treated feed

| Fatty Acid | Conventional Feed | OCFA Enriched Feed |
|---|---|---|
| C14:0 | 0.38% | 0.22% |
| *C15:0* | *0.0* | *0.88%* |
| C16:0 | 24.4% | 25.4% |
| C16:1 | 1.53% | 2.22% |
| *C17:0* | *0.12%* | *0.84%* |
| C18:0 | 9.21% | 8.78% |
| C18:1 | 40.07% | 34.7% |
| C18:2 | 18.44% | 20.35% |
| C18:3 | 0.56% | 0.66% |
| C20:4 | 0.0 | 0.0 |
| C22:5n6 | 1.07% | 0.99% |
| C22:6 (DHA) | 0.83% | 1.57% |
| % TFA of Biomass | 50.3 | 52.1% |
| Protein % of Biomass | 38 | 36 |
| *Total OCFA* | *0.12%* | *1.72%* |

Analytical verification was used to ensure that the targeted composition was met for the OCFA-enriched poultry feed pellets. Pellets were chosen as the form of the OCFA-enriched poultry feed because the chickens would not be able to differentiate between the OCFA-enriched poultry feed versus their typical base feed, which was also in pelletized form. This helped to ensure the chickens' consumption of the OCFA-enriched poultry feed. Additionally, chickens tend to waste less feed when it is in pelletized form, again helping to ensure that they are consuming the OCFA-enriched poultry feed. The base feed for the control chickens is simply pressed into pellets with no additional components added and fed as noted in the treatment description further below.

For this study, 4-6 chickens were established as the control group. The control group was fed the standard commercially available base feed. The control group chickens were allowed to eat freely as they desired, which was at a rate of about 0.25 lbs/day/chicken. Another group of 4-6 chickens made up the test group. The test group was fed with the OCFA-enriched poultry feed, with contained the 2.6% inclusion of OCFA rich *Aurantiochytrium acetophilum* HS399 biomass. The test group chickens were also allowed to eat freely as they desired, which was also at a rate of about 0.25 lbs/day/chicken. Eggs from both the control group and the test group were collected either daily or every other day and were delivered for analysis twice per week on Mondays and Thursdays.

For preparation of the samples, egg yolks were separated from the egg whites and only the yolks were analyzed. The eggs were mixed at 3-6 eggs per every 2-3 day period, freeze dried, and then submitted for analysis.

FIG. 1 is a line graph showing the fatty acid composition (in percent TFA) of various fatty acids in the eggs of the test group chickens throughout the test duration. The raw data gathered during the experiment is presented in Table 2 below.

TABLE 2

Percentage of TFA of Various Fatty Adds in Test Group Eggs

| Day | C15:0 | C16:0 | C17:0 | C18:1 | C22:5n6 (DPA) | C22:6n3 (DHA) |
|---|---|---|---|---|---|---|
| 0 | 0.00 | 24.40 | 0.35 | 40.07 | 1.07 | 0.83 |
| 4 | 0.00 | 25.93 | 0.33 | 36.05 | 0.93 | 0.76 |
| 7 | 0.88 | 25.40 | 0.84 | 34.70 | 1.00 | 1.52 |
| 10 | 2.44 | 24.79 | 2.23 | 31.95 | 0.63 | 3.65 |
| 14 | 2.91 | 24.10 | 2.74 | 31.47 | 0.40 | 4.52 |
| 16 | 2.86 | 23.30 | 2.93 | 32.10 | 0.37 | 4.92 |
| 20 | 2.66 | 24.13 | 2.79 | 32.95 | 0.35 | 4.66 |
| 23 | 2.77 | 24.10 | 2.89 | 32.90 | 0.41 | 4.57 |
| 27 | 2.59 | 26.10 | 2.55 | 31.99 | 0.35 | 4.34 |
| 30 | 2.71 | 24.26 | 2.98 | 32.73 | 0.39 | 4.69 |
| 34 | 2.76 | 25.25 | 2.83 | 31.40 | 0.31 | 4.52 |
| 37 | 2.787 | 23.9377 | 2.921 | 30.783 | 0.35 | 4.64 |
| 41 | 2.822 | 23.724 | 2.882 | 30.671 | 0.39 | 5.01 |
| 44 | 2.955 | 22.807 | 3.18 | 30.729 | 0.37 | 5.14 |
| 48 | 2.627 | 24.025 | 2.889 | 31.315 | 0.48 | 5.48 |
| 51 | 2.59 | 23.49 | 2.90 | 32.13 | 0.36 | 5.02 |
| 55 | 2.35 | 23.98 | 2.69 | 32.53 | 0.31 | 4.54 |
| 58 | 1.56 | 23.92 | 1.88 | 34.07 | 0.33 | 3.57 |
| 62 | 0.554 | 25.268 | 0.888 | 36.898 | 0 | 2.036 |
| 65 | 0.35 | 26.091 | 0.575 | 36.973 | 0 | 1.6 |
| 69 | 0.379 | 25.701 | 0.631 | 37.6228 | 0 | 1.575 |
| 72 | 0.788 | 25.371 | 1.088 | 36.781 | 0 | 2.1 |
| 76 | 1.361 | 24.697 | 1.79 | 35.866 | 0 | 3.054 |
| 79 | 1.876 | 24.09 | 2.369 | 34.635 | 0 | 3.554 |
| 83 | 2.6433 | 21.7742 | 3.4425 | 32.1067 | 0.3524 | 4.594 |
| 86 | 2.419 | 22.422 | 3.33605 | 33.39 | 0.24875 | 4.0553 |
| 90 | 2.502 | 23.0734 | 2.865 | 32.5869 | 0.33351 | 3.9364 |
| 93 | 2.255 | 23.9631 | 2.7715 | 34.3698 | 0.2832 | 3.9036 |
| 97 | 2.6483 | 23.458 | 3.0494 | 33.4611 | 0.3486 | 4.3577 |

For this experiment, OCFA-enriched poultry feed was utilized in two separate phases of the experiment. Phase I includes the initial introduction of OCFA-enriched poultry feed to the chickens and feeding until a steady state is seen in the fatty acid profile of the eggs. Then OCFA-enriched poultry feed is stopped to observe how quickly the OCFA levels in the eggs drop. Phase II begins with re-introduction of the OCFA-enriched poultry feed to the chickens and then again observing the impact on the fatty acid profile of the eggs.

Test chickens were started on OCFA containing feed on day 0, and various fatty acids either rise of fall until a new level is reached. On day 50, test chickens were switched to a standard commercially available feed (i.e. not containing OCFA rich *Aurantiochytrium acetophilum* HS399 biomass) and the fatty acid levels in the eggs started to fall; although the OCFA levels never reached their original low levels. On day 66 Phase II is initiated, as the test chickens were again switched to the OCFA-enriched poultry feed and the levels of fatty acids responded, rising to a level of 4.6% DHA, 3.4% C17:0 and 2.6% C15:0 which are in line with the averages in Phase I of the experiment.

Figure 2:
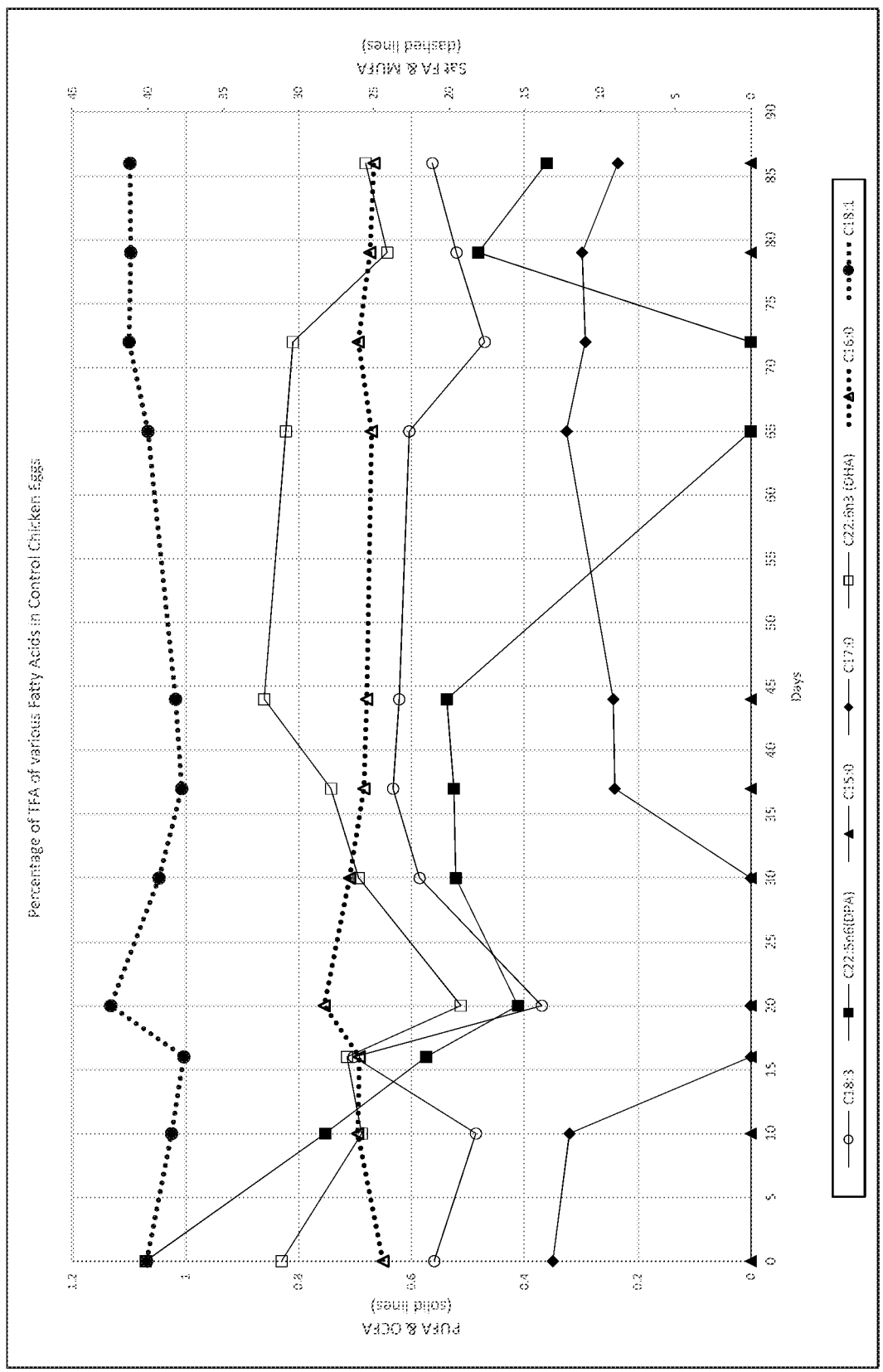
FIG. 2 is a line graph showing the fatty acid composition (in percent TFA) of various fatty acids in the eggs of the control group chickens.

FIG. 2 is a line graph showing the fatty acid composition (in percent TFA) of various fatty acids in the eggs of the control group chickens throughout the test duration. The raw data gathered during the experiment is presented in Table 3 below.

TABLE 3

Percentage of TFA of Various Fatty Acids in Control Group Eggs

| Day | C15:0 | C16:0 | C17:0 | C18:1 | C18:3 | C22:5n6 (DPA) | C22:6 (DHA) |
|---|---|---|---|---|---|---|---|
| 0 | 0 | 24.4 | 0.35 | 40.07 | 0.56 | 1.07 | 0.83 |
| 10 | 0 | 26.063 | 0.32 | 38.421 | 0.49 | 0.753 | 0.688 |
| 16 | 0.00 | 25.97 | 0.00 | 37.61 | 0.70 | 0.574076 | 0.714121 |
| 20 | 0 | 28.28979 | 0 | 42.4551 | 0.3698 | 0.412054 | 0.512666 |
| 30 | 0 | 26.61415 | 0 | 39.24438 | 0.585817 | 0.521864 | 0.693454 |
| 37 | 0 | 25.6591 | 0.2406 | 37.737 | 0.6327 | 0.5253 | 0.7426 |
| 44 | 0 | 25.4615 | 0.2431 | 38.1539 | 0.6219 | 0.5377 | 0.8605 |
| 65 | 0 | 25.149 | 0.3259 | 39.983 | 0.6041 | 0 | 0.8226 |
| 72 | 0 | 26.0368 | 0.2927 | 41.2339 | 0.4707 | 0 | 0.8095 |
| 79 | 0 | 25.251 | 0.2982 | 41.1259 | 0.5202 | 0.4817 | 0.6428 |
| 86 | 0 | 24.9952 | 0.23465 | 41.1792 | 0.5629 | 0.361 | 0.681 |

As shown, there are no trends of significance. For example, DHA begins at ~0.8% and then drops as low as 0.5% but then ends at ~0.7%. This is just natural drift as a result of amount of feed intake the chickens have, error in analysis, and chicken health.

Figure 3:
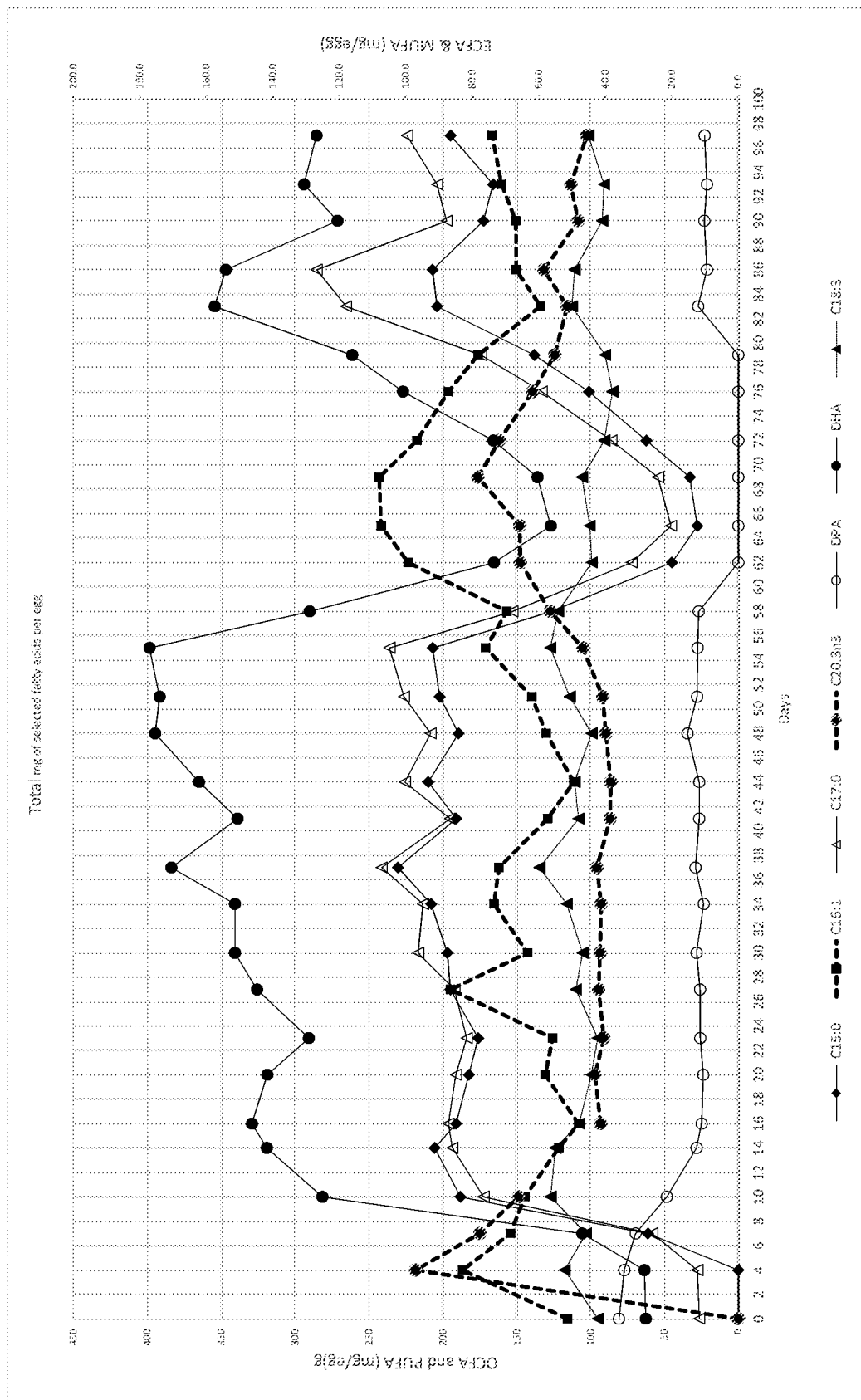
FIG. 3 is a line graph showing the mg of OCFA and DHA calculated for each egg of the test group chickens based on the compositional profile and the total fat content of each egg.

The mg of OCFA and DHA were calculated for each egg of the test group chickens based on the compositional profile and the total fat content of each egg. These results are shown graphically in FIG. 3 and the raw data from this experiment is shown in Table 4 below.

TABLE 4

Total mg of Certain Fatty Acids Per Egg

| Day | C15:0 | C16:1 | C17:0 | C18:3 | C20:3 n3 | C22:5n6 (DPA) | C22:6 (DHA) |
|---|---|---|---|---|---|---|---|
| 0 | 0.0 | 115.4 | 26.4 | 42.3 | 0.0 | 80.7 | 62.6 |
| 4 | 0.0 | 186.6 | 27.8 | 52.2 | 218.4 | 77.1 | 63.5 |
| 7 | 61.1 | 154.1 | 58.3 | 45.8 | 174.9 | 69.4 | 105.5 |
| 10 | 188.1 | 144.4 | 172.4 | 56.5 | 148.8 | 48.3 | 281.3 |
| 14 | 205.4 | 121.4 | 193.4 | 55.1 |  | 28.2 | 319.0 |
| 16 | 190.9 | 108.2 | 196.1 | 47.9 | 93.2 | 24.9 | 329.1 |
| 20 | 182.2 | 130.5 | 191.0 | 44.2 | 97.0 | 23.7 | 318.6 |
| 23 | 175.9 | 125.5 | 183.7 | 42.3 | 91.1 | 25.7 | 290.5 |
| 27 | 194.9 | 194.8 | 191.9 | 48.9 | 94.5 | 26.0 | 325.7 |
| 30 | 196.9 | 142.6 | 216.7 | 46.9 | 93.5 | 28.3 | 340.6 |
| 34 | 207.8 | 165.3 | 213.4 | 51.6 | 92.9 | 23.5 | 340.5 |
| 37 | 230.2 | 161.9 | 241.3 | 59.8 | 95.7 | 29.0 | 383.6 |
| 41 | 191.0 | 129.0 | 195.0 | 48.0 | 86.7 | 26.5 | 338.8 |
| 44 | 209.7 | 111.4 | 225.7 | 49.3 | 86.4 | 26.5 | 364.9 |
| 48 | 189.2 | 129.9 | 208.1 | 44.2 | 89.7 | 34.4 | 394.5 |
| 51 | 202.1 | 139.7 | 226.2 | 50.7 | 91.7 | 27.8 | 391.5 |
| 55 | 206.7 | 170.8 | 236.0 | 56.6 | 105.3 | 27.6 | 398.3 |
| 58 | 126.8 | 156.6 | 152.9 | 54.2 | 127.2 | 26.7 | 290.0 |
| 62 | 45.0 | 223.3 | 72.1 | 44.1 | 147.5 | 0.0 | 165.3 |
| 65 | 27.7 | 241.6 | 45.6 | 44.7 | 147.9 | 0.0 | 126.8 |
| 69 | 32.7 | 242.9 | 54.4 | 47.0 | 176.2 | 0.0 | 135.8 |
| 72 | 62.2 | 217.5 | 85.9 | 40.3 | 161.7 | 0.0 | 165.7 |
| 76 | 101.1 | 196.2 | 133.0 | 37.9 | 139.3 | 0.0 | 226.9 |
| 79 | 137.9 | 176.2 | 174.2 | 40.1 | 124.2 | 0.0 | 261.3 |
| 83 | 203.8 | 133.8 | 265.4 | 50.0 | 115.9 | 27.2 | 354.2 |
| 86 | 206.9 | 150.3 | 285.3 | 49.3 | 131.5 | 21.3 | 346.8 |
| 90 | 172.3 | 150.7 | 197.3 | 41.0 | 108.4 | 23.0 | 271.1 |
| 93 | 165.8 | 160.1 | 203.8 | 40.4 | 113.3 | 21.3 | 293.8 |
| 97 | 194.7 | 166.6 | 224.2 | 45.1 | 102.6 | 22.8 | 285.3 |

As shown, the results are very similar to the TFA profiles noted in FIG. 1 and corresponding Table 2. For example, the total fatty acid content of Phase I and Phase II is again very similar at their steady state values. Additionally, it is again observed that some fatty acids, such as C16:1, have an inverse relationship to the content of OCFA. However, this representation makes it easy to observe the amounts of fatty acid that one would receive by consuming an egg laid by a chicken that consumed OCFA-enriched poultry feed (i.e. an OCFA-enriched poultry egg). For example, where one OCFA-enriched poultry egg yields about 420 mg OCFA, a typical two egg breakfast using two OCFA-enriched poultry eggs would give the consumer the recommended daily allowance of DHA (1 gram per day) and over 800 mg of OCFA per day, which is equivalent to getting the fatty acid nutrition out of almost 10 glasses of milk.

Figure 4:
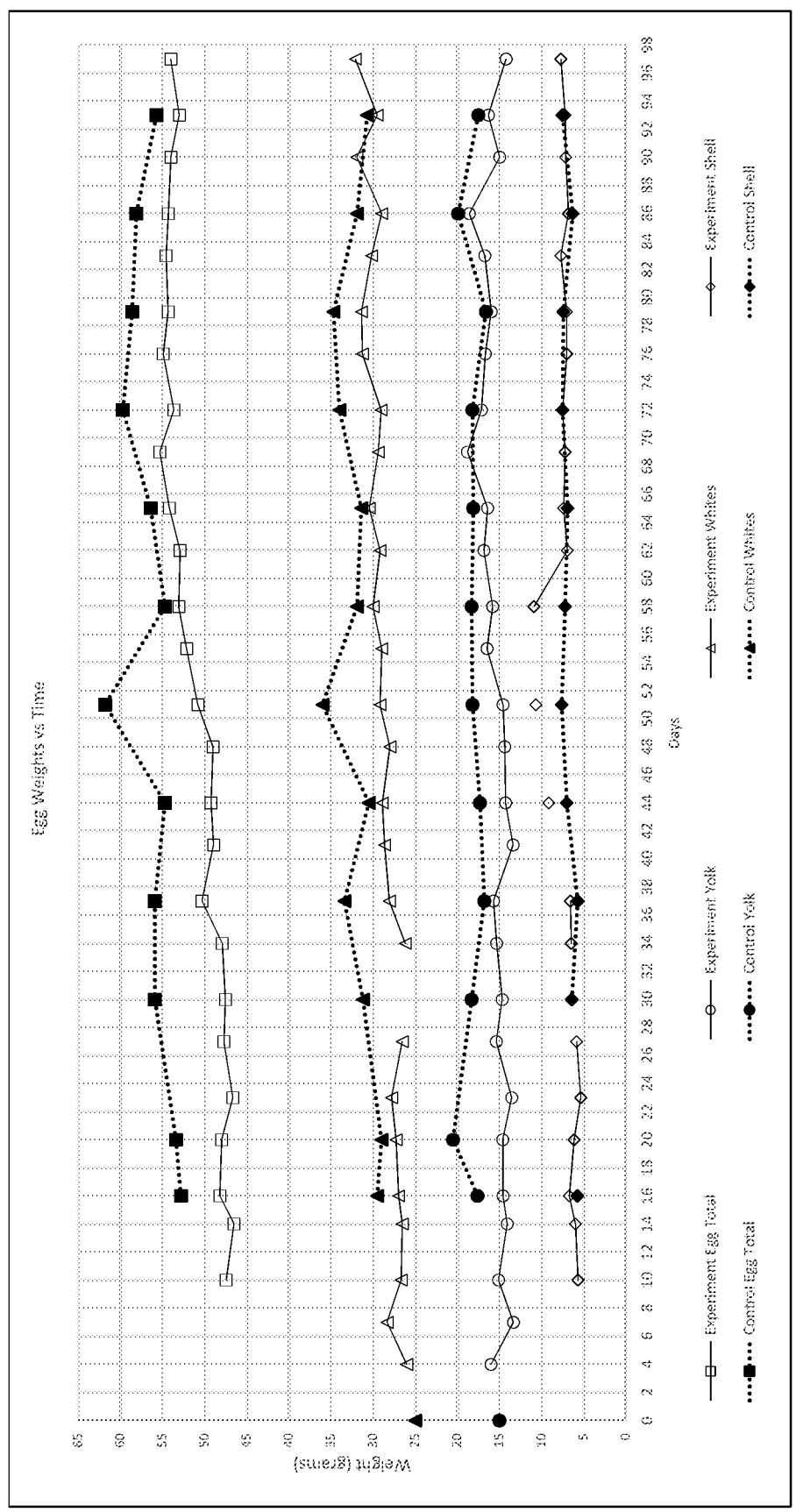
FIG. 4 is a line graph showing the weight of both control group chicken eggs and test group chicken eggs over time.

The weight of both control and test eggs were collected over time, and are represented in FIG. 4 and Table 5 below.

TABLE 5

Egg Weight Over Time

| Day | Control Egg weight (g) | Control Yolk weight (g) | Control White weight (g) | Control Shell weight (g) |
|---|---|---|---|---|
| 0 |  | 15.00 | 25.00 |  |
| 4 |  |  |  |  |

TABLE 5-continued

Egg Weight Over Time

| Day | Control Egg weight (g) | Control Yolk weight (g) | Control White weight (g) | Control Shell weight (g) |
|---|---|---|---|---|
| 7 | | | | |
| 10 | | | | |
| 14 | | | | |
| 16 | 52.8 | 17.57 | 29.50 | 5.71 |
| 20 | 53.4 | 20.50 | 29.00 | |
| 30 | 55.9 | 18.30 | 31.20 | 6.40 |
| 37 | 55.9 | 16.80 | 33.40 | 5.70 |
| 44 | 54.7 | 17.30 | 30.50 | 7.00 |
| 51 | 61.8 | 18.20 | 36.00 | 7.60 |
| 58 | 54.7 | 18.30 | 31.90 | 7.20 |
| 65 | 56.4 | 18.10 | 31.40 | 6.90 |
| 72 | 59.7 | 18.20 | 34.00 | 7.50 |
| 79 | 58.6 | 16.60 | 34.70 | 7.40 |
| 86 | 58.1 | 19.90 | 31.90 | 6.30 |
| 93 | 55.7 | 17.50 | 30.70 | 7.50 |

As shown, there are no significant trends of weight gain, or weight loss over time in either the control group chicken eggs or in the test group chicken eggs. There does not appear to be an impact on the overall weight of the egg from OCFA-enriched poultry feed consumption. There is a slight upward trend in the test group chicken egg total weight, and an even more slight upward trend in the control group chicken egg total weight. This trend is not related to the consumption of OCFA-enriched poultry feed, as both control group chicken eggs and test group chicken eggs have this slight trend. This non-significant trend can be attributed to the maturing of the chickens themselves. The chickens used in the study were younger chickens, and as they matured the eggs they laid gained weight. The control group chickens were older than the test group chickens by about 6 months. A typical egg is 55-62 g, and both the test group chicken eggs and control group chicken eggs were trending in this slightly upward direction. There was also no observable effect from OCFA-enriched poultry feed consumption on the chicken appearance or health.

As shown in Tables 2-5 above and corresponding FIGS. 1-4, the amount of OCFA collected in the yolk of the top 6 performing OCFA-enriched poultry eggs achieved a maximum average of 5.85% OCFA of the total fatty acid. This averages to about 445 mg OCFA per OCFA-enriched poultry egg. By comparison, this is equivalent to the amount of OCFA that a consumer would receive by drinking 5.4 glasses of 2% milk. By further comparison, a single OCFA-enriched poultry egg would provide the equivalent intake of OCFA to the total consumption of OCFA per capita availability per day based on USDA data (i.e. if you take the USDA dairy intake per capita in the US and factor in how much OCFA is in the dairy, then about 0.48 g OCFA/day is how much a consumer would receive from total dairy products only (dairy products include milk, cheese, yogurt, etc.). The eggs of the control group chickens yielded an average of about 22 mg OCFA per egg. This is 20 times less than the maximum average of the OCFA-enriched poultry eggs. In other words, the amount of OCFA in the OCFA-enriched poultry eggs was 1,922% higher than the amount of OCFA in the eggs of the control group chickens that were only fed standard chicken feed.

Tables 2-5 above and corresponding FIGS. 1-4 also show that the amount of OCFA that collected in the yolk of the OCFA-enriched poultry eggs during the steady state portion of Phase I (day 16 to day 55), was 5.58% OCFA of the total fatty acid. This averages to 408 mg OCFA per OCFA-enriched poultry egg with a standard deviation of 33 mg OCFA/OCFA-enriched poultry egg. By comparison, this is equivalent to the amount of OCFA that a consumer would receive by drinking 4.8 glasses of 2% milk. The eggs of the control group chickens yielded an average of about 22 mg OCFA per egg. This is 18.5 times less than the average of the OCFA-enriched poultry eggs. In other words, the amount of OCFA in the OCFA-enriched poultry eggs was 1,755% higher than the amount of OCFA in the eggs of the control group chickens that were only fed standard chicken feed.

It is also shown in Tables 2-5 above and corresponding FIGS. 1-4 that the amount of OCFA that collected in the yolk of the OCFA-enriched poultry eggs during the steady state portion of Phase II (day 83 to day 97), was 5.59% OCFA of the total fatty acid. This averages to 424 mg OCFA per OCFA-enriched poultry egg with a standard deviation of 56 mg OCFA/OCFA-enriched poultry egg. The layer chickens were very near molting by the end of the experiment and this may have contributed to the higher standard deviation of the data. By comparison, this is equivalent to the amount of OCFA that a consumer would receive by drinking 5.0 glasses of 2% milk. This value of 424 mg OCFA per OCFA-enriched poultry egg is <4% higher than that of Phase I, and considered to be well within the experimental error of the experiment. Therefore, Phase II may be considered a replication of the results of Phase I. The eggs of the control group chickens yielded an average of about 22 mg OCFA per egg. This is 19.3 times less than the average of the OCFA-enriched poultry eggs. In other words, the amount of OCFA in the OCFA-enriched poultry eggs was 1,827% higher than the amount of OCFA in the eggs of the control group chickens that were only fed standard chicken feed.

As also shown in Tables 2-5 above and corresponding FIGS. 1-4, the DHA content of the OCFA-enriched poultry eggs was about 340 mg DHA per OCFA-enriched poultry egg, whereas the eggs of the control group chickens yielded only about 60 mg DHA per egg.

An in-house taste test was performed using both the control group chicken eggs ("farm fresh" eggs), and the test group chicken eggs (OCFA-enriched poultry egg). The experiment was of interest because the DHA, which is contained in the test group chicken eggs along with the OCFA, can generate a 'fishy' or off taste. In particular, DHA can generate this off taste when it becomes oxidized, and as oxidation is exacerbated by heating, it was a question if cooking the eggs would cause the eggs to taste like fish, which clearly would not be a benefit for the general appeal of the eggs to a consumer.

In a blind study, ten in-house participants evaluated both the control group chicken eggs and the test group chicken eggs (containing the OCFA and DHA). Both eggs were prepared by simply cooking them "over easy" in butter on an electric skillet with no additional salt, pepper or any other component added. As observed in the image below, there is no difference in appearance of the OCFA-enriched poultry eggs or farm fresh egg as they are cooking on the skillet surface.

Figure 5:
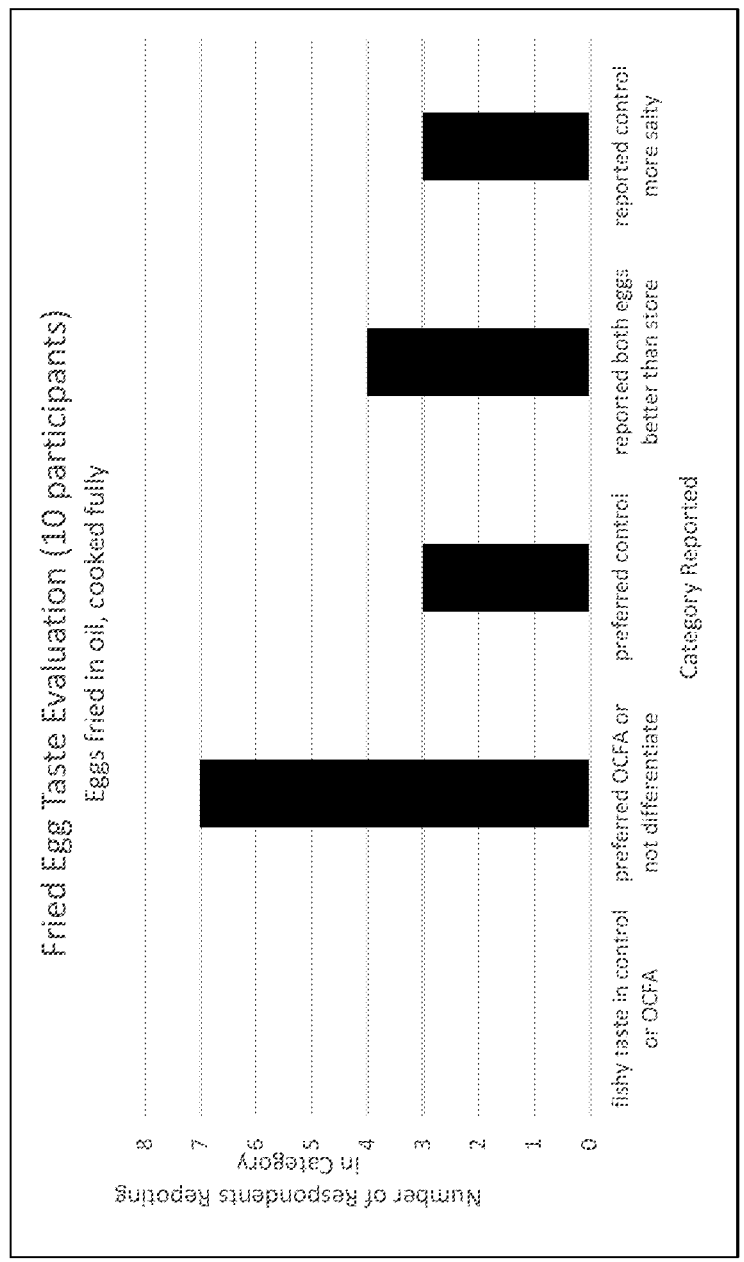
FIG. 5 is a bar graph detailing the results of a blind taste test evaluation of the OCFA-enriched poultry eggs versus the eggs of the control group chickens.

The results are shown in FIG. 5. The most important question was of course whether any hint of 'fishy' or off taste could be detected in the OCFA-enriched poultry eggs. None of the 10 participants could find any taste of fish or off taste in either of the eggs. The next most important determination was if the OCFA or DHA in the test group chicken eggs would impact the taste such that they could be differentiated from the control group chicken eggs. About 70% of the participants preferred the OCFA-enriched poultry eggs or could not tell a difference in the two eggs. Thirty percent of the participants were able to pick out the OCFA-enriched poultry eggs, and each reported that the control egg tasted "more salty" than the OCFA-enriched poultry eggs. As they were prepared in identical methods, this is an unexpected observation. A final interesting observation was that several participants thought both eggs were clearly better than anything they purchase at the conventional shopping market.

All references, including publications, patent applications, and patents, cited herein, are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

Unless otherwise stated, all exact values provided herein are representative of corresponding approximate values (e.g., all exact exemplary values provided with respect to a particular factor or measurement can be considered to also provide a corresponding approximate measurement, modified by "about," where appropriate). All provided ranges of values are intended to include the end points of the ranges, as well as values between the end points.

The citation and incorporation of patent documents herein is done for convenience only and does not reflect any view of the validity, patentability, and/or enforceability of such patent documents.

The inventive concepts described herein include all modifications and equivalents of the subject matter recited in the claims and/or aspects appended hereto as permitted by applicable law.

The citation and incorporation of patent documents herein is done for convenience only and does not reflect any view of the validity, patentability, and/or enforceability of such patent documents.

The inventive concepts described herein include all modifications and equivalents of the subject matter recited in the claims and/or aspects appended hereto as permitted by applicable law.

Although a particular feature of the disclosed techniques and systems may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the innovative concepts described herein, including the best mode, and also to enable one of ordinary skill in the art to practice the innovative concepts described herein, including making and using any devices or systems and performing any incorporated methods. The patentable scope of the innovative concept described herein is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the innovative concept described herein has been described for purposes of illustrating the best mode known to the applicant at the time and enable one of ordinary skill in the art to practice the innovative concepts described herein, including making and using devices or systems and performing incorporated methods. The examples are illustrative only and not meant to limit the innovative concept described herein, as measured by the scope and merit of the claims. The innovative concept described herein has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the innovative concept described herein is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

REFERENCES

1. Weitkunat, K., Schumann, S., Nickel, D., Hornemann, S., Petzke, K. J., Schulze, M. B., . . . Klaus, S. (2017). Odd-chain fatty acids as a biomarker for dietary fiber intake: a novel pathway for endogenous production from propionate. The American Journal of Clinical Nutrition, 105(6), ajcn 152702. https://doi.org/10.3945/ajcn.117.152702.
2. Rezanka, T., & Sigler, K. (2009). Odd-numbered very-long-chain fatty acids from the microbial, animal and plant kingdoms. Progress in Lipid Research, 48(3-4), 206-238. https://doi.org/10.1016/j.plipres.2009.03.003.

What is claimed is:

1. A method for producing a poultry egg with an elevated amount of pentadecanoic (C15:0) and heptadecanoic (C17:0) odd-chain fatty acids (OCFA), comprising:

culturing *Aurantiochytrium acetophilum* HS399 microalgae cells to increase an amount of pentadecanoic (C15:0) and heptadecanoic (C17:0) acids in the *Aurantiochytrium acetophilum* HS399 microalgae cells compared to naturally occurring *Aurantiochytrium acetophilum* HS399 microalgae cells, resulting in OCFA-rich *Aurantiochytrium acetophilum* HS399 microalgae biomass that comprises a total amount of pentadecanoic (C15:0) and heptadecanoic (C17:0) acids that is greater than 0.3% total fatty acid, wherein *Aurantiochytrium acetophilum* HS399 is deposited under Accession No. NCMA 201909001;

mixing a desired amount of OCFA-rich *Aurantiochytrium acetophilum* HS399 microalgae biomass into poultry feed resulting in an OCFA-enriched feed composition, the desired amount being about 1.5-6.3% of the OCFA-enriched feed composition;

feeding the OCFA-enriched feed composition to poultry that lays eggs; and retrieving an egg produced by the poultry, the egg comprising an elevated amount of OCFA in the lipid profile of the yolk, wherein the elevated amount of OCFA is an amount greater than 3% of the fatty acid profile of the yolk.

2. The method of claim 1 wherein the step of culturing *Aurantiochytrium acetophilum* HS399 microalgae cells to increase the amount of pentadecanoic (C15:0) and heptadecanoic (C17:0) acids in the *Aurantiochytrium acetophilum* HS399 microalgae cells further comprises the steps of:
providing a culture medium;
adding *Aurantiochytrium acetophilum* HS399 microalgae cells to the culture medium; and
adding propionic acid to the culture medium at a rate of at least 0.05 gram of propionic acid per gram of *Aurantiochytrium acetophilum* HS399 microalgae cells.

3. The method of claim 1 wherein the desired amount of the OCFA-rich *Aurantiochytrium acetophilum* HS399 microalgae biomass is about 2.6% of the OCFA-enriched feed composition.

4. The method of claim 1 wherein the OCFA-enriched feed composition comprises a total amount of pentadecanoic (C15:0) and heptadecanoic (C17:0) acids that is about 1.72% of the total fatty acid profile of the OCFA-enriched feed composition.

5. The method of claim 1 wherein the poultry egg comprises over 400 mg of pentadecanoic (C15:0) and heptadecanoic (C17:0) acids.

6. The method of claim 1 wherein the step of culturing *Aurantiochytrium acetophilum* HS399 microalgae cells to increase the amount of pentadecanoic (C15:0) and heptadecanoic (C17:0) acids in the *Aurantiochytrium acetophilum* HS399 microalgae cells further comprises the steps of:
providing a culture medium;
adding *Aurantiochytrium acetophilum* HS399 microalgae cells to the culture medium; and
adding propionic acid to the culture medium at a rate of at least about 0.05-0.15 gram of propionic acid per gram of *Aurantiochytrium acetophilum* HS399 microalgae cells.

7. The method of claim 1 wherein the step of culturing *Aurantiochytrium acetophilum* HS399 microalgae cells further comprises culturing the *Aurantiochytrium acetophilum* HS399 microalgae cells in a two-stage axenic process, the two-stage axenic process comprising:

a first stage of adding dextrose or glucose as a growth carbon source; and
a second stage of adding propionate.

8. A method for increasing an amount of pentadecanoic (C15:0) and heptadecanoic (C17:0) acids in an egg laid by a poultry animal comprising the steps of:
culturing *Aurantiochytrium* microalgae cells to increase an amount of pentadecanoic (C15:0) and heptadecanoic (C17:0) acids in the *Aurantiochytrium acetophilum* HS399 microalgae cells compared to naturally occurring *Aurantiochytrium acetophilum* HS399 microalgae cells, resulting in OCFA-rich *Aurantiochytrium acetophilum* HS399 biomass that comprises a total amount of pentadecanoic (C15:0) and heptadecanoic (C17:0) acids that is greater than 0.3% total fatty acid, wherein *Aurantiochytrium acetophilum* HS399 is deposited under Accession No. NCMA 201909001;
mixing a desired amount of the OCFA-rich *Aurantiochytrium acetophilum* HS399 microalgae biomass into poultry feed resulting in an OCFA-enriched feed composition, the desired amount being greater than 1% of the OCFA-enriched feed composition;
feeding the OCFA-enriched feed composition to the poultry animal that lays eggs; and
retrieving an egg produced by the poultry animal, wherein the egg comprises a total amount of pentadecanoic (C15:0) and heptadecanoic (C17:0) acids that is greater than 3% of the total fatty acid profile of the egg yolk.

9. The method of claim 8 wherein the step of culturing *Aurantiochytrium acetophilum* HS399 microalgae cells to increase an amount of pentadecanoic (C15:0) and heptadecanoic (C17:0) acids in the *Aurantiochytrium acetophilum* HS399 microalgae cells further comprises the steps of:
providing a culture medium;
adding *Aurantiochytrium acetophilum* HS399 microalgae cells to the culture medium; and
adding propionic acid to the culture medium.

10. The method of claim 8 wherein the poultry egg comprises about 250 mg to 1,000 mg of pentadecanoic (C15:0) and heptadecanoic (C17:0) acids.

11. The method of claim 8 wherein the OCFA-enriched feed composition comprises a total amount of pentadecanoic (C15:0) and heptadecanoic (C17:0) acids that is about 1.72% of the total fatty acid profile of the OCFA-enriched feed composition.

12. The method of claim 8 wherein the poultry egg comprises over 400 mg of pentadecanoic (C15:0) and heptadecanoic (C17:0) acids.

13. The method of claim 8 wherein the step of culturing *Aurantiochytrium acetophilum* HS399 microalgae cells further comprises culturing the *Aurantiochytrium acetophilum* HS399 microalgae cells in a two-stage axenic process, the two-stage axenic process comprising:
a first stage of adding dextrose or glucose as a growth carbon source; and
a second stage of adding propionate.

14. A method for producing a poultry egg with an elevated amount of pentadecanoic (C15:0) and heptadecanoic (C17:0) odd-chain fatty acids (OCFA), comprising:
culturing *Aurantiochytrium acetophilum* HS399 microalgae cells to increase an amount of pentadecanoic (C15:0) and heptadecanoic (C17:0) acids in the *Aurantiochytrium acetophilum* HS399 microalgae cells compared to naturally occurring *Aurantiochytrium acetophilum* HS399 microalgae cells, resulting in OCFA-rich *Aurantiochytrium acetophilum* HS399 microalgae biomass that comprises a total amount of pentadecanoic (C15:0) and heptadecanoic (C17:0) acids that is greater than 0.3% total fatty acid, wherein *Aurantiochytrium acetophilum* HS399 is deposited under Accession No. NCMA 201909001;

mixing a desired amount of oil, derived from the OCFA-rich *Aurantiochytrium acetophilum* HS399 microalgae biomass, comprising elevated concentrations of pentadecanoic (C15:0) and heptadecanoic (C17:0) acids into poultry feed resulting in an OCFA-enriched feed composition, the desired amount of oil being at least 0.5% of the OCFA-enriched feed composition;

feeding the OCFA-enriched feed composition to poultry that lays eggs; and retrieving an egg produced by the poultry, the egg comprising an elevated amount of OCFA in the lipid profile of the yolk, wherein the elevated amount of OCFA is an amount greater than 3% of the fatty acid profile of the yolk.

15. The method of claim 14, wherein the desired amount of oil is about 0.5% to 4% of the OCFA-enriched feed composition.

16. The method of claim 14, wherein the desired amount of oil is about 1.5% to 6.3% of the OCFA-enriched feed composition.

17. The method of claim 14, wherein the step of culturing *Aurantiochytrium acetophilum* HS399 microalgae cells to increase the amount of pentadecanoic (C15:0) and heptadecanoic (C17:0) acids in the *Aurantiochytrium acetophilum* HS399 microalgae cells further comprises the steps of:

providing a culture medium;

adding *Aurantiochytrium acetophilum* HS399 microalgae cells to the culture medium; and adding propionic acid to the culture medium at a rate of at least 0.05 gram of propionic acid per gram of *Aurantiochytrium acetophilum* HS399 microalgae cells.

18. The method of claim 14, wherein the step of culturing *Aurantiochytrium acetophilum* HS399 microalgae cells further comprises culturing the *Aurantiochytrium acetophilum* HS399 microalgae cells in a two-stage axenic process, the two-stage axenic process comprising:

a first stage of adding dextrose or glucose as a growth carbon source; and a second stage of adding propionate.

* * * * *